United States Patent
Liggesmeyer

(10) Patent No.: US 7,047,523 B1
(45) Date of Patent: May 16, 2006

(54) SYSTEM FOR DETERMINING A TOTAL ERROR DESCRIPTION OF AT LEAST ONE PART OF A COMPUTER PROGRAM

(75) Inventor: Peter Liggesmeyer, Potsdam (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/980,489

(22) PCT Filed: Apr. 3, 2000

(86) PCT No.: PCT/DE00/01001

§ 371 (c)(1),
(2), (4) Date: Dec. 3, 2001

(87) PCT Pub. No.: WO00/75780

PCT Pub. Date: Dec. 14, 2000

(30) Foreign Application Priority Data

Jun. 2, 1999 (DE) ................. 199 25 239

(51) Int. Cl.
*G06F 9/44* (2006.01)

(52) U.S. Cl. ............... 717/132; 717/156; 714/38; 714/48

(58) Field of Classification Search ........ 717/131–133, 717/154–156; 714/26, 57, 38, 48, 79, 799
See application file for complete search history.

(56) References Cited

U.S. PATENT DOCUMENTS

| | | | | |
|---|---|---|---|---|
| 5,500,941 A | * | 3/1996 | Gil .............................. | 714/38 |
| 5,586,252 A | * | 12/1996 | Barnard et al. ............... | 714/48 |
| 5,740,357 A | * | 4/1998 | Gardiner et al. .............. | 714/57 |
| 5,903,453 A | * | 5/1999 | Stoddard, II ................. | 700/79 |
| 6,012,152 A | * | 1/2000 | Douik et al. .................. | 714/26 |

OTHER PUBLICATIONS

N. Leveson et al., "Safety Verification of ADA Programs Using Software Fault Trees", IEEE Software, Jul. 8, 1991, No. 4, pp. 48-59.
R. Vishnuvajjala et al., "Flow Analysis for Concurrent, Reactive, Real-Time Systems", IEEE High Assurance Systems Engineering Workshop, Oct. 1996, pp. 176-183.
M. Weiser, "Program Slicing", IEEE Transactions Software Engineering, vol. SE-10, No. 4, Jul. 1984, pp. 352-357.
International Electrotechnical Commission, "Fault Tree Analysis (FTA)," 61025/Ed.2/CD, 2004.

* cited by examiner

*Primary Examiner*—Antony Nguyen-Ba
(74) *Attorney, Agent, or Firm*—Staas & Halsey LLP

(57) ABSTRACT

A section of a computer program is used to ascertain a control flow description and a data flow description, and program elements are selected from the section of the computer program. For each selected program element, a stored fault description associated with a respective reference element is used to ascertain an element fault description which describes possible faults in the respective program element. The element fault descriptions are used to ascertain the overall fault description, taking into account the control flow description and the data flow description.

14 Claims, 12 Drawing Sheets

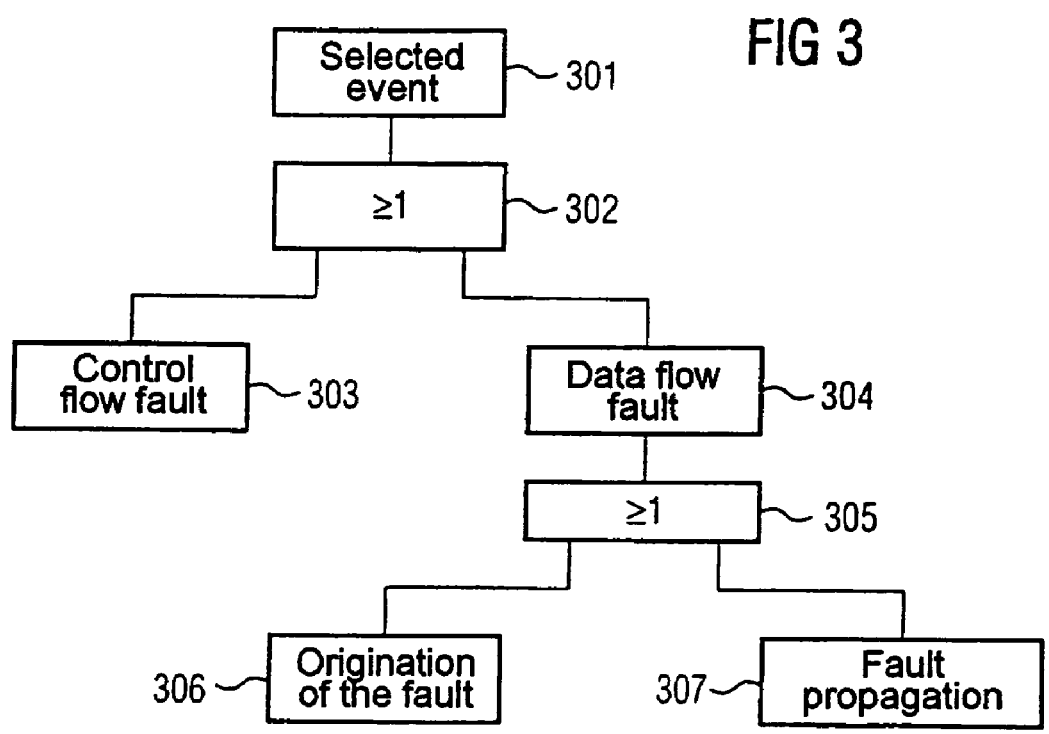

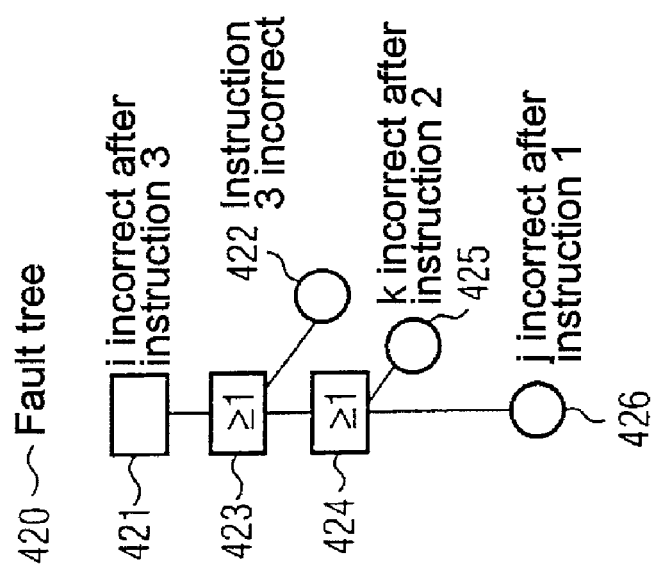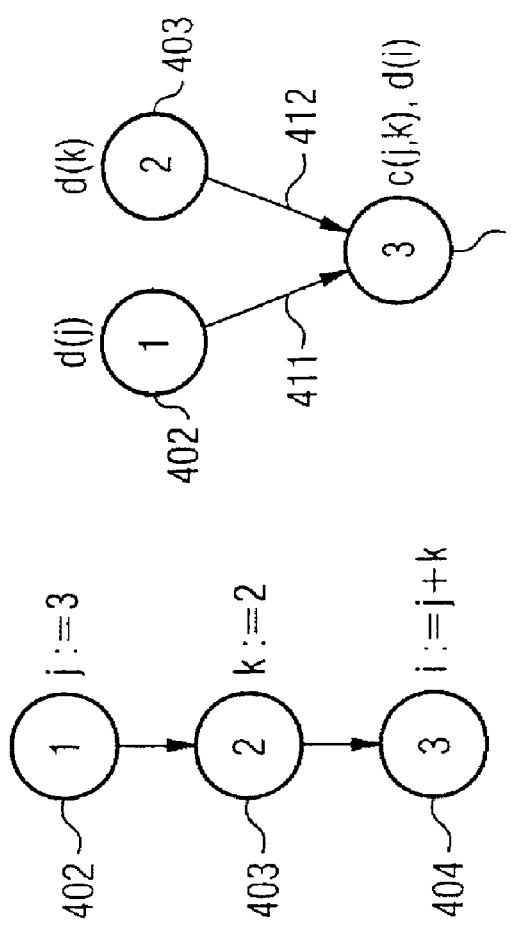

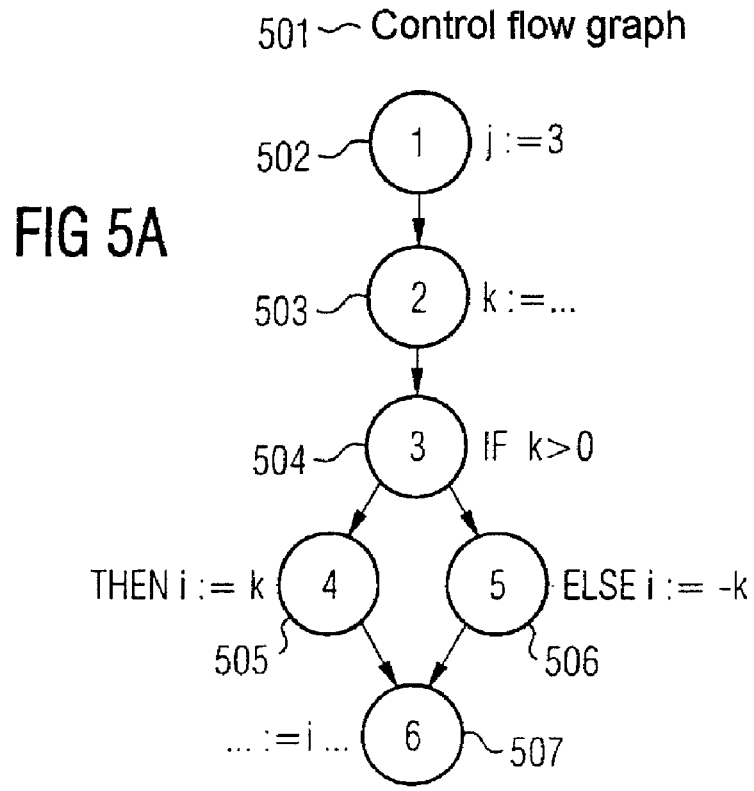
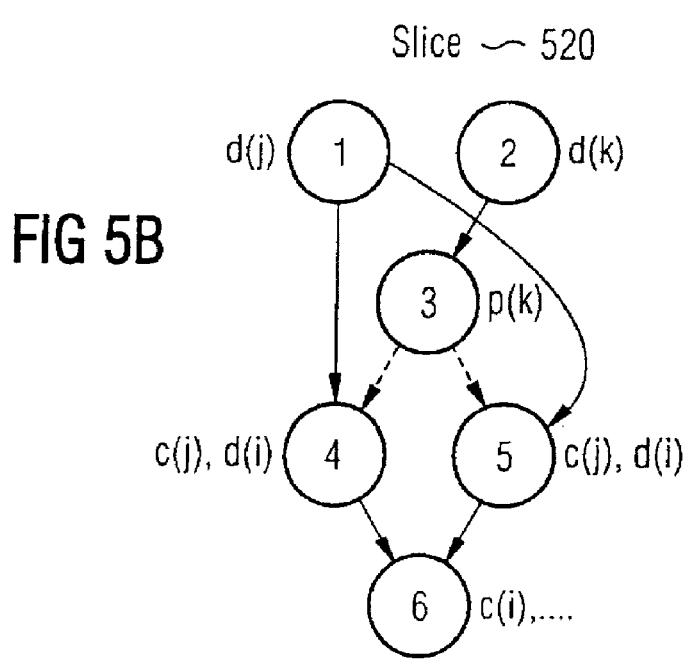

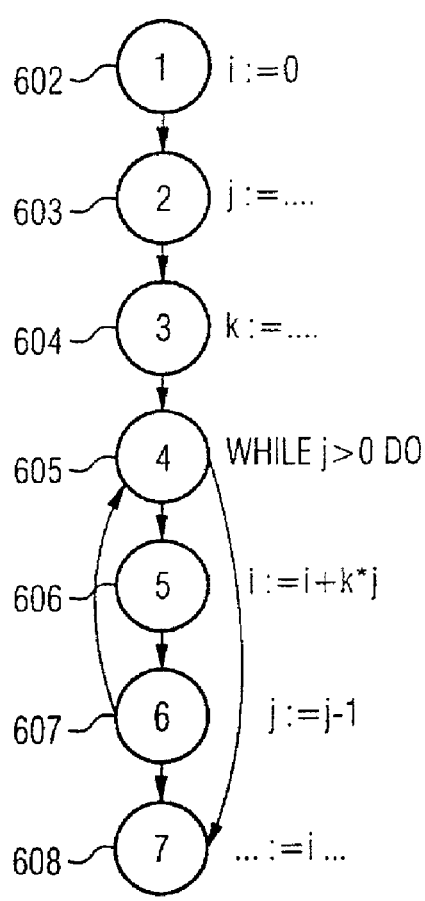
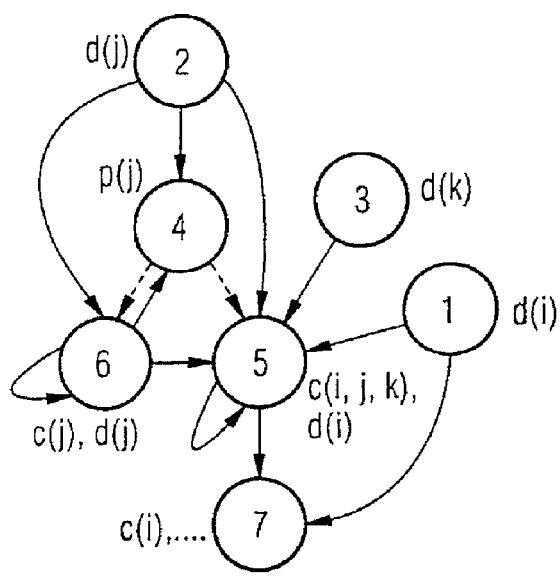

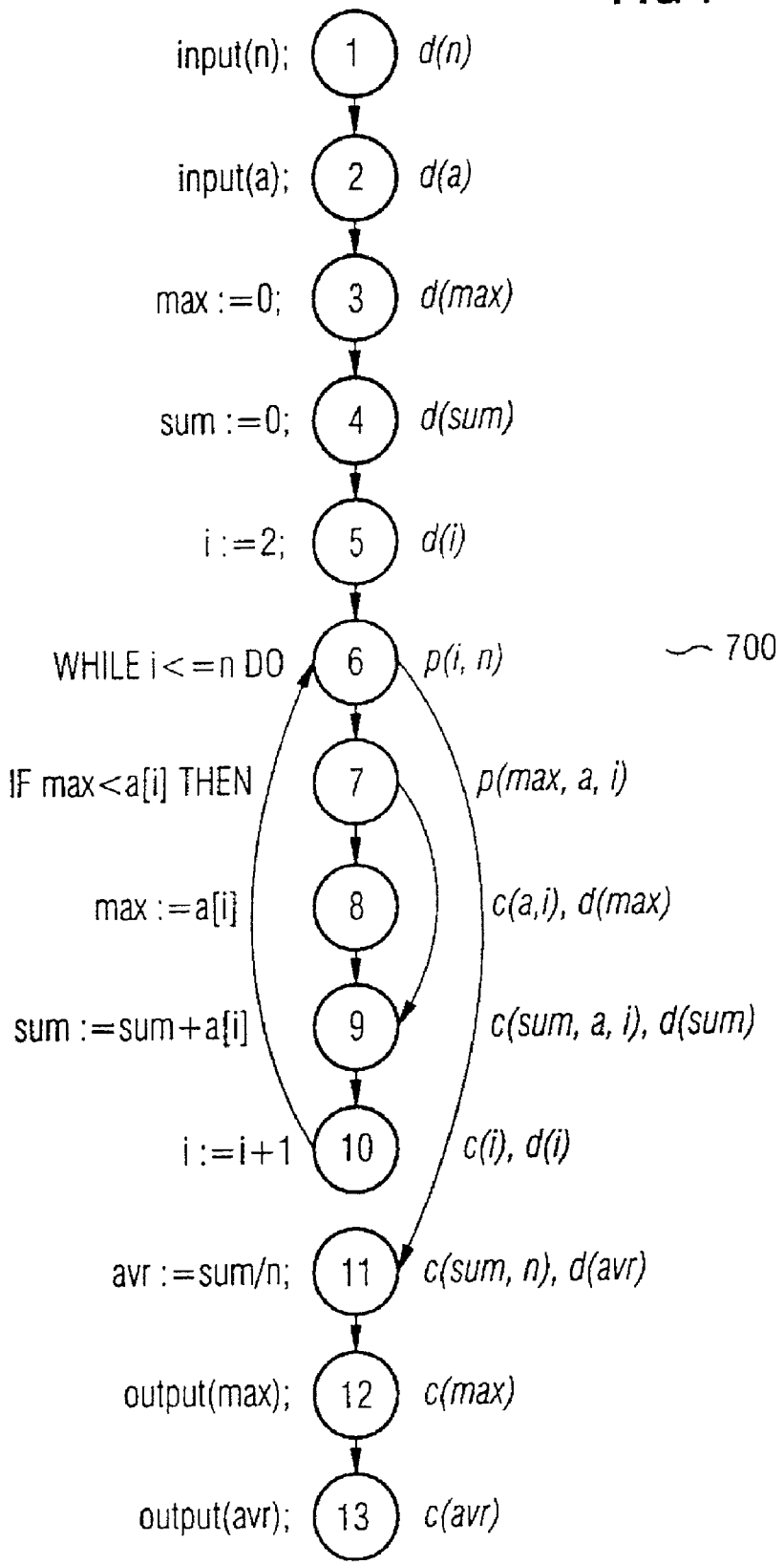

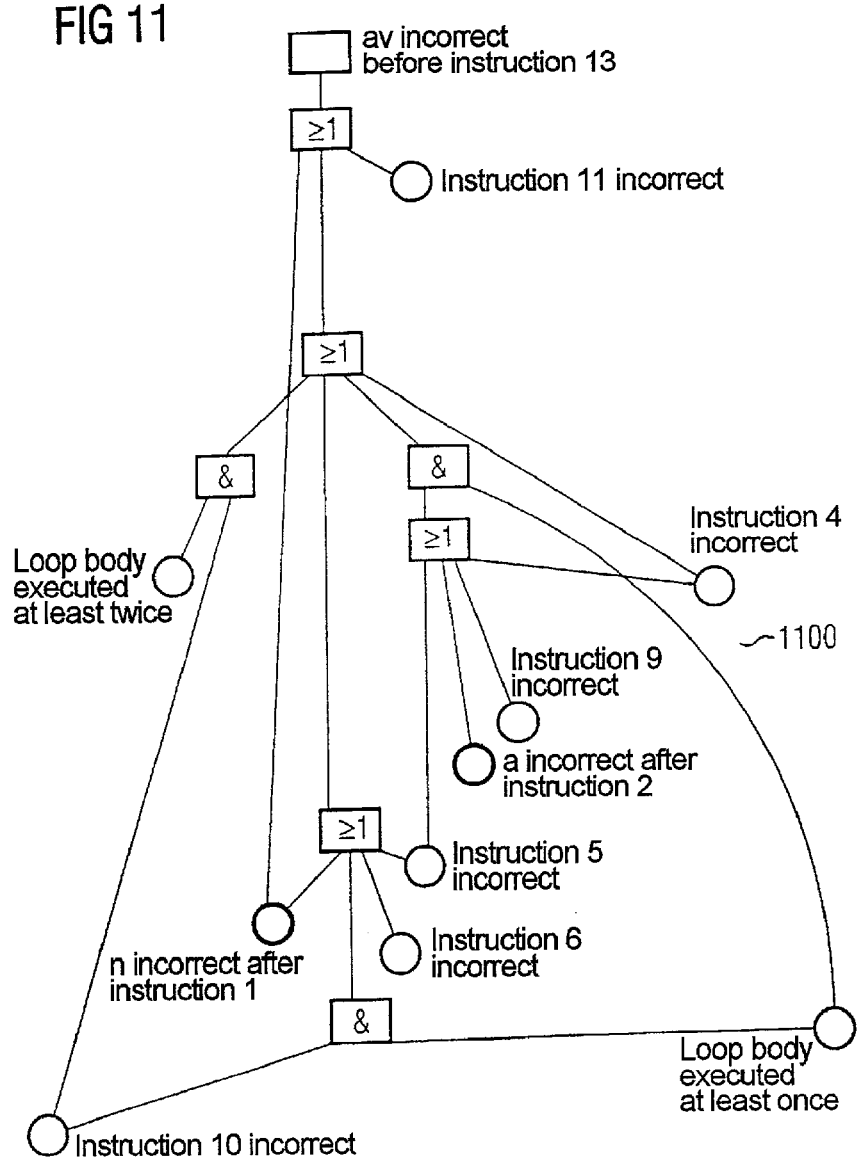

SYSTEM FOR DETERMINING A TOTAL ERROR DESCRIPTION OF AT LEAST ONE PART OF A COMPUTER PROGRAM

CROSS REFERENCE TO RELATED APPLICATIONS

This application is based on and hereby claims priority to German Patent Application No. 19925239.4 filed on Jun. 2, 2001, the contents of which are hereby incorporated by reference.

REFERENCE TO COMPUTER PROGRAM LISTING, COMPACT DISC APPENDIX

A compact disc is included herewith and incorporated by reference herein having thereon a computer program listing appendix in the ASCII uncompressed text format with ASCII carriage return, ASCII line feed and all control codes defined in ASCII, having computer compatibility with IBM PC/XT/AT or compatibles, having operating system compatibility with MS-Windows and including file PROGRA~6.TXT (Program-Listing.txt in Windows) of 130,121 bytes, created on Nov. 29, 2001.

BACKGROUND OF THE INVENTION

The invention relates to a method and a system for ascertaining an overall fault description for at least one section of a computer program, and also to a computer product and a computer-readable storage medium.

Such a method and such a system are known from N. Leveson, "Safety Verification of ADA Programs Using Software Fault Trees", IEEE Software, July 1991, pages 48–59, which discloses the practice of using computers to ascertain an overall fault description in the form of an overall fault tree for a computer program. For the computer program, a control flow description is ascertained in the form of a control flow graph. For various program elements of the computer program, a stored fault description associated with a respective stored reference element is used to ascertain an element fault description. The fault description for a reference element describes possible faults in the respective reference element. The element fault descriptions in the form of element fault trees are used to ascertain the overall fault description, taking into account the control flow graph for the computer program.

The method and the system taught by Leveson have the following drawbacks, in particular. The overall fault tree ascertained is incomplete in terms of the faults examined and the causes thereof, and is therefore unreliable. Hence, this practice is not appropriate for use within the context of generating fault trees for a computer program for safety-critical applications. The individual fault trees associated with the reference elements are also incomplete and hence unreliable.

M. Weiser, "Program Slicing", in IEEE Transaction on Software Engineering, Vol. 10, No. 4, July 1984, pp. 352–357 provides an overview of "slicing". Slicing is the analysis carried out when searching for causes of incorrect action in a computer program. This procedure involves checking whether the incorrect action has been caused by an instruction currently under consideration. If this is not the case, the instructions which deliver data for or control the execution of the instruction are checked. This method is continued until no further operations exist, that is to say it gets to input data for the computer program. In slicing, "slices" are ascertained. A slice shows which instructions are affected in what way by a value under consideration. Below, the term slicing is always understood to mean backwardly directed slicing.

P. Liggesmeyer, Modultest und Modulverifikation—State of the Art, Mannheim, Vienna, Zurich: BI Wissenschaftsverlag, 1990 discloses the practice of ascertaining a control flow description and a data flow description for a computer program. In Liggesmeyer, this representation is used as an initial basis for "data-flow-oriented testing" of the computer program. The instructions (nodes) of the control flow graph are assigned data flow attributes (data flow description) which describe the nature of the data access operations contained in the instructions of the computer program. A distinction is drawn between write access operations and read access operations. Write access operations are referred to as definitions (def). Read access operations are referred to as a reference. If a read access operation takes place in a decision, this access operation is referred to as a predicative reference (p-use, predicate use). A read access operation during calculation of a value is referred to as a computational reference (c-use, computational use).

DIN 25424-1: Fehlerbaumanalysen; Methoden und Bildzeichen, September 1981, which has a title that can be translated "Fault Tree Analyses; Methods and Graphic Symbols", discloses principles relating to a fault tree. A fault tree is to be understood, as described in DIN 25424-1, to mean a structure which describes logical relationships between input variables for the fault tree which lead to a prescribed undesirable event.

In addition, DIN 25424-2: Fehlerbaumanalyse; Handrechenverfahren zur Auswertung eines Fehlerbaums, Berlin, Beuth Verlag GmbH, April 1990 which has a title that can be translated "Fault Tree Analysis; Manual Computation Methods for Evaluating a Fault Tree", discloses various methods for fault tree analysis.

SUMMARY OF THE INVENTION

The invention is based on the problem of ascertaining an overall fault description which is more reliable than ascertaining an overall fault tree in the manner known on the basis of the method taught by Leveson.

In a method for ascertaining an overall fault description for at least one section of a computer program, using a computer, at least the section of the computer program is stored. A control flow description and a data flow description are ascertained for the section of the computer program, and program elements are selected from the section of the computer program. For each selected program element, a stored fault description is used to ascertain an element fault description. The fault description is associated with a respective reference element. The element fault description describes possible faults in the respective program element. A fault description for a reference element describes possible faults in the respective reference element. The element fault descriptions are used to ascertain the overall fault description, which takes into account the control flow description and the data flow description.

A system for ascertaining an overall fault description for at least one section of a computer program has a processor which is set up such that the following method steps can be carried out:

at least the section of the computer program is stored, a control flow description and a data flow description are ascertained for the section of the computer program, program elements are selected from the section of the computer program, for each selected program element, a stored fault description associated with a respective reference element is used to ascertain an element fault description which describes possible faults in the respective program element, a fault description for a reference element describes possible faults in the respective reference element, the element fault descriptions are used to ascertain the overall fault description, taking into account the control flow description and the data flow description.

A computer program product comprises a computer-readable storage medium on which a program is stored which, when it has been loaded into a memory in a computer, allows the computer to carry out the following steps for ascertaining an overall fault description for at least one section of a computer program:

at least the section of the computer program is stored, a control flow description and a data flow description are ascertained for the section of the computer program, program elements are selected from the section of the computer program, for each selected program element, a stored fault description associated with a respective reference element is used to ascertain an element fault description which describes possible faults in the respective program element, a fault description for a reference element describes possible faults in the respective reference element, the element fault descriptions are used to ascertain the overall fault description, taking into account the control flow description and the data flow description.

A computer-readable storage medium stores a program which, when it has been loaded into a memory in a computer, allows the computer to carry out the following steps for ascertaining an overall fault description for at least one section of a computer program:

at least the section of the computer program is stored, a control flow description and a data flow description are ascertained for the section of the computer program, program elements are selected from the section of the computer program, for each selected program element, a stored fault description associated with a respective reference element is used to ascertain an element fault description which describes possible faults in the respective program element, a fault description for a reference element describes possible faults in the respective reference element, the element fault descriptions are used to ascertain the overall fault description, taking into account the control flow description and the data flow description.

The invention now makes it possible to ascertain a reliable overall fault description, which takes into account the peculiarities of a computer program, for a computer program or a section thereof. Since the overall fault description ascertained is much more reliable than the overall fault description which can be ascertained on the basis of the method taught by Leveson, the invention is also suitable for safety-critical applications, i.e. in particular for ascertaining an overall fault description for a safety-critical computer program.

The control flow description and/or the data flow description may be in the form of a control flow graph or of a data flow graph, respectively.

The fault description may be in the form of a stored fault tree, and the element fault description can be ascertained as an element fault tree. In this case, the overall fault description can be ascertained as an overall fault tree. This development permits standardized representation of a fault description, which makes it much simpler for a user of the fault description to analyze same.

In one development, the overall fault description can be used for fault analysis in the section of the computer program. This development has the advantage, in particular, that automated, reliable fault analysis becomes possible, and if the fault descriptions are in the form of fault trees the fault description can even be analyzed in a manner "normalized" in accordance with the fault tree analysis methods.

In another refinement, the overall fault description is ascertained as an overall fault tree, and the overall fault tree is altered in terms of prescribable boundary conditions. The alteration can be made by adding a complementary fault tree.

BRIEF DESCRIPTION OF THE DRAWINGS

These and other objects and advantages of the present invention will become more apparent and more readily appreciated from the following description of the exemplary embodiment of the invention as explained in more detail below and as illustrated in the figures, in which:

FIG. 3 is a general fault tree, as formed basically for a reference element;

FIGS. 4a to 4c are flow diagrams for a control flow graph (FIG. 4a), a slice (FIG. 4b) and a fault tree (FIG. 4c) for an instruction sequence as a reference element of a computer program;

FIGS. 5a to 5c are flow diagrams for a control flow graph (FIG. 5a), a slice (FIG. 5b) and a fault tree (FIG. 5c) for a selection sequence as a reference element of a computer program;

FIGS. 6a to 6c are flow diagrams for a control flow graph (FIG. 6a), a slice (FIG. 6b) and a fault tree (FIG. 6c) for a loop as a reference element of a computer program;

FIG. 7 is a control flow graph with a data flow graph for a computer program in accordance with the exemplary embodiment;

FIG. 11 is a flow diagram for the overall fault tree based on FIG. 10, where redundant events from the overall fault tree based on FIG. 10 have been combined into one event.

DETAILED DESCRIPTION OF THE PREFERRED EMBODIMENT

Figure 1:
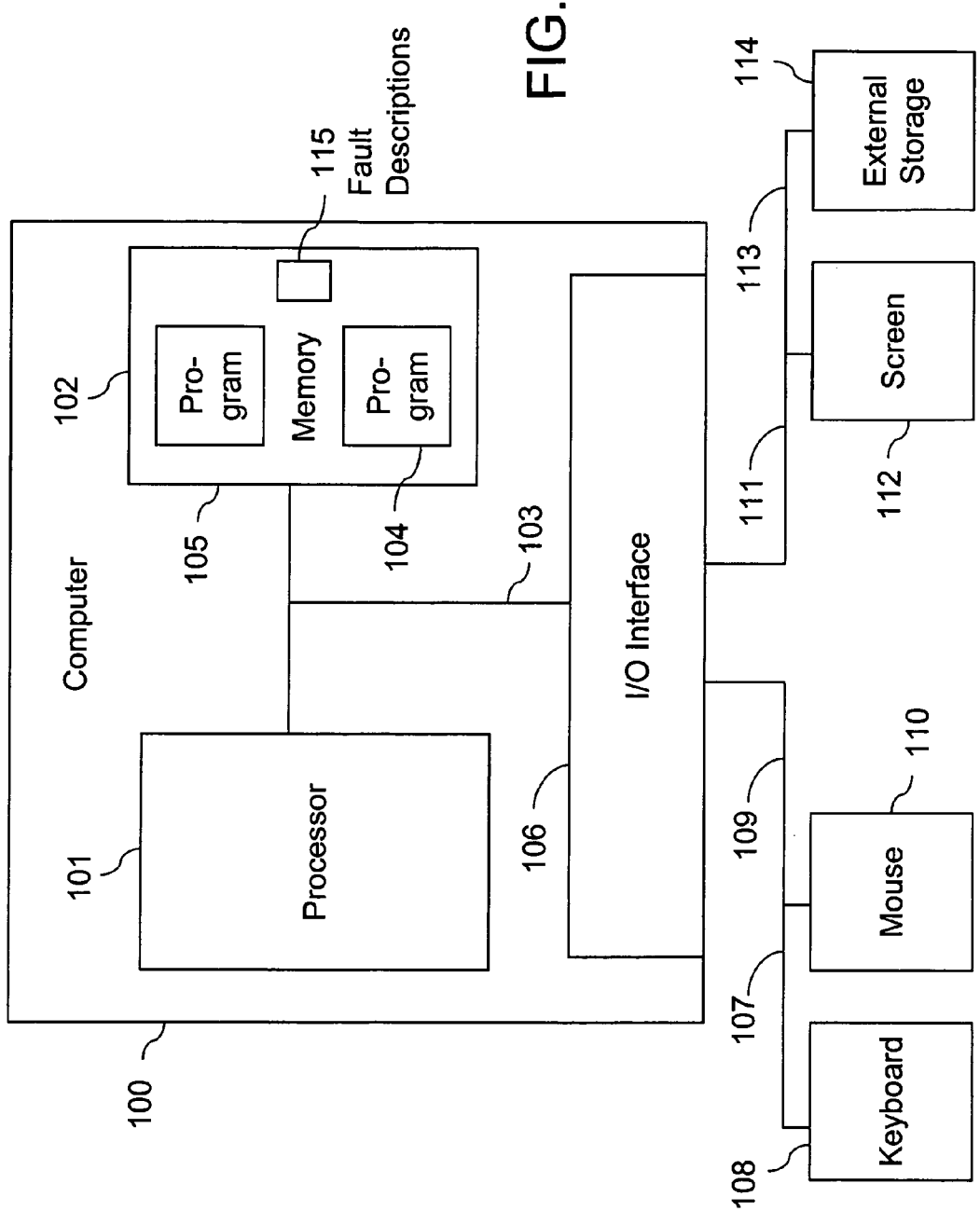
FIG. 1 is a block diagram of a computer used to carry out the method in accordance with the exemplary embodiment.

Reference will now be made in detail to the preferred embodiments of the present invention, examples of which are illustrated in the accompanying drawings, wherein like reference numerals refer to like elements throughout.

FIG. 1 shows a computer 100 used to carry out the method described below. The computer 100 has a processor 101 which is connected to a memory 102 via a bus 103. The bus 103 also has an input/output interface 106 connected to it.

The memory 102 stores a computer program 104 for which an overall fault description is ascertained in the manner described below. In addition, the memory 102 stores a program 105 which implements the method described below. The memory also stores fault descriptions 115 for different reference elements of a computer program. A fault description for a reference element describes possible faults in the respective reference element. Various reference elements and fault descriptions associated with the reference elements are explained in detail below.

The input/output interface 106 has a keyboard 108 connected to it via a first connection 107. A second connection 109 is used to connect the input/output interface 106 to a computer mouse 110, and a third connection 111 is used to connect the input/output interface 106 to a screen 112 on which the overall fault description ascertained for the computer program 104 is displayed. A fourth connection 113 is used to connect the input/output interface 106 to an external storage medium 114.

Figure 2:
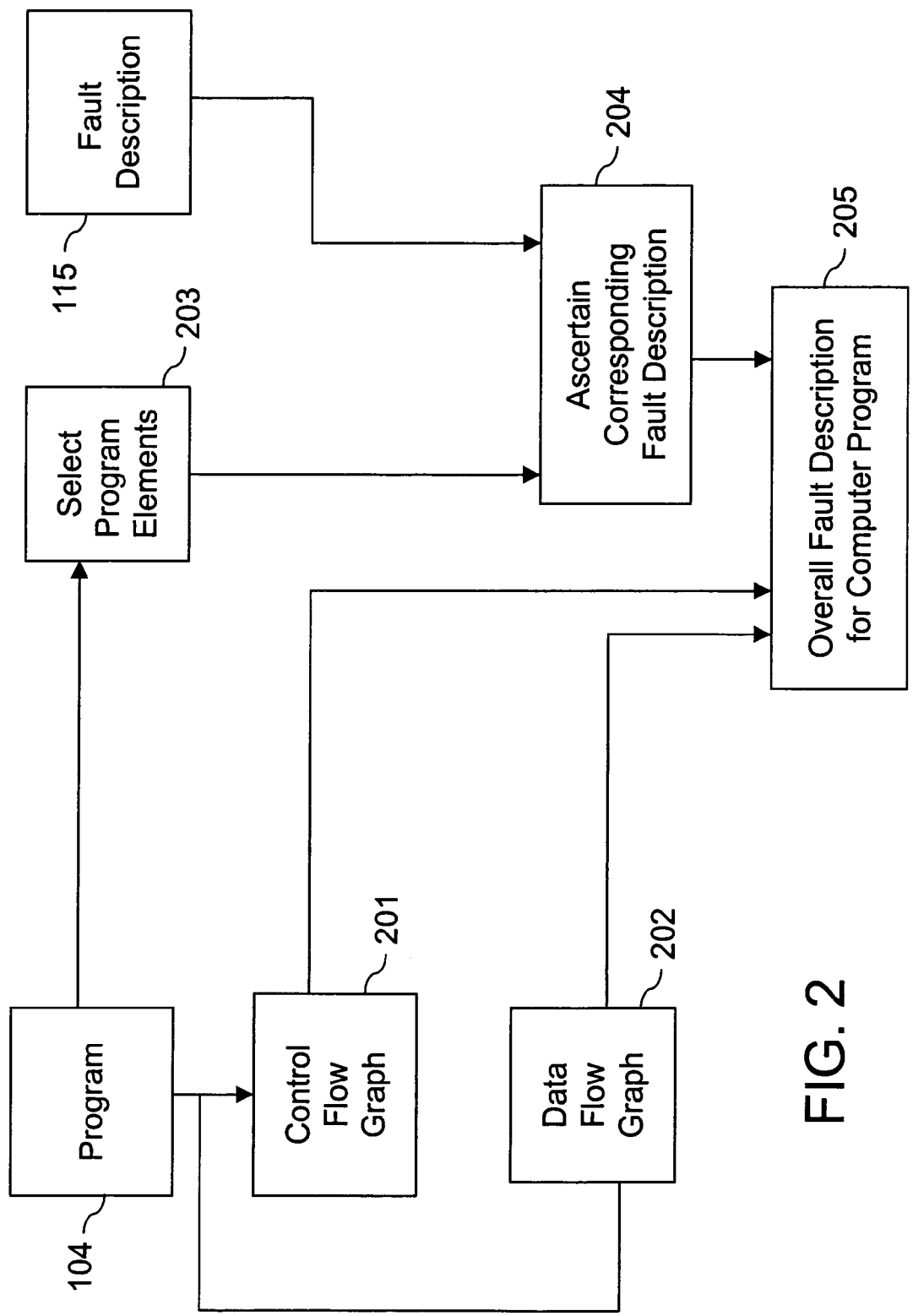
FIG. 2 is a flowchart showing the individual method steps of the method in accordance with the exemplary embodiment.

FIG. 2 shows a block diagram illustrating the procedure in accordance with the exemplary embodiment described below.

The stored computer program 104 is used to ascertain a control flow graph 201 and a data flow graph 202 for the computer program 104.

Individual program elements are selected from the computer program (step 203). For each program element selected, a stored fault description associated with a reference element corresponding to the selected program element is used to ascertain an element fault description (step 204). The element fault description describes possible faults in the respective selected program element.

On the basis of a fault event in the computer program (undesirable event), which fault event is prescribed by a user and needs to be examined, in a final step (step 205) an overall fault description for the computer program is ascertained, for the fault instance to be examined, from the element fault descriptions, taking into account the control flow graph and the data flow graph. The overall fault tree ascertained is displayed to the user on the screen 112.

FIG. 3 shows the basic procedure for creating a fault tree, as used in the initial example in order to form the fault trees described below for the reference elements.

For an event 301 selected by a user, it is necessary to ascertain how the selected incorrect event can arise. In a computer program, incorrect output of a variable, as a selected incorrect event (undesirable event) 301, can be caused by a control flow fault 303 and/or a data fault 304 (INCLUSIVE-OR function 302).

A control flow fault 303 is to be understood to mean incorrect control of the processing of the respective variable.

The data flow fault 304 is to be understood to mean a fault which arises during processing as a result of incorrect data. The data flow fault 304 may originate in the processing step currently under consideration (block 306) and/or it may already have been present and may be maintained only by fault propagation (block 307) (INCLUSIVE-OR function 305).

On the basis of these considerations, the appropriate fault tree, a slice describing the instruction and a control flow graph are respectively illustrated below for the following elements of a computer program:

an instruction sequence,
a selection element,
a loop element.

Instruction Sequence

The instruction sequence 401 comprises the three instructions shown in FIG. 4a. In a first instruction 402, a first variable j is assigned the value 3 (j:=3). A second instruction 403 assigns a second variable k the value 2 (k:=2). A third instruction 404 forms a sum using the first variable and the second variable (i:=j+k).

In accordance with the practice disclosed in Weiser, a slice 410 is formed for this instruction sequence 401, as shown in FIG. 4b. The first instruction 402 and the second instruction 403 both affect the third instruction 404, which is illustrated by two arrows 411, 412 in the slice 410.

For the control flow graph 401, the fault tree 420 shown in FIG. 4c is obtained for the following prescribed undesirable event 421: "Variable i is incorrect after the third instruction".

The incorrect event 421 may have been produced by a fault in the third instruction 404 under consideration itself, if the data up to this instruction step were correct (element 422 in FIG. 4c). The incorrect event 421 may also be caused by corrupt input data for the third instruction, however, i.e. as a result of INCLUSIVE-ORing 424 the events that the second variable k was incorrect after the second instruction (element 425) and/or that the first variable j was incorrect after the first instruction 402 (element 426). The result of the first INCLUSIVE-ORed function 424 is INCLUSIVE-ORed with the event that the third instruction is incorrect (INCLUSIVE-OR function 423).

Selection Element

With a selection element as reference element, it is necessary to consider possibilities of fault in the data flows and in the control flows within the computer program.

FIGS. 5a to 5c show a control flow graph 501 (cf. FIG. 5a), a slice 520 (cf. FIG. 5b) and a fault tree 540 (cf. FIG. 5c) for an If-Then-Else instruction as a selection element. The control flow graph 501 comprises the following six instructions:

a first instruction 502, which assigns a first variable j the value 3 (j:=3),
a second instruction 503, which assigns a second variable k a prescribable value (k:= . . . ),
a third instruction 504, which checks whether the second variable k has a value greater than 0; if the value of the second variable is greater than 0, the instruction branches to a fourth instruction 505, otherwise it branches to a fifth instruction 506,
the fourth instruction 505, which assigns a third variable i the value of the second variable k (i:=k),
a fifth instruction 506, which assigns the third variable i the value of the second variable k with a negative arithmetic sign (i:=−k),
a sixth instruction 507, which processes the third variable i further in an arbitrary manner.

For the control flow graph 501 shown in FIG. 5a, the slice 520 shown in FIG. 5b is obtained for the selection element. Solid edges in the slice 520 show a data dependency between the different instructions. Dashed edges indicate control dependencies between the appropriate instructions.

The following definitions apply for the two edge types:
dashed edges, referred to as control edges below, are directed from instructions which contain a predicative reference (failure constructs, loop control) to the directly controlled instructions, i.e. to those instructions which are executed only if the predicate has a particular value. Control edges are drawn only between the controlling instruction and directly interleaved instructions. If a controlled block contains a further interleaved control level, no control edges crossing more than one level are drawn. Since a control relationship is transitive, this indirect control can be inferred from the slice by utilizing the transitivity.

solid edges, referred to as data flow edges below, are directed from instructions in which a variable is defined to instructions in which this variable is referenced. The variable under consideration cannot be defined again between the definition and the reference. This is referred to as a definition-free path for the variable under consideration.

The slice is ascertained by searching the control flow graph, counter to the edge direction, for a definition of the variable under consideration starting from the instruction containing the variable under consideration, for which the undesirable event is prescribed. If computational references exist for the definition, the method is continued recursively until no further additional nodes are found. The dependencies found in this way between instructions are data dependencies. If a node under consideration is contained in a block whose execution is controlled directly by a decision, this represents a control dependency. For the predicative references of the variables involved in the decision, nodes with appropriate definitions—that is to say data flow dependencies—are recursively sought which have other control dependencies.

FIG. 5b shows the failure element's associated slice 520 with corresponding control edges and data flow edges.

FIG. 5c shows the fault tree 540 for the prescribed event "the third variable i is incorrect before the 6th instruction" 541.

The following events result in the incorrect event 541 when INCLUSIVE-ORed 542:

ANDing 543 the events that the decision in accordance with the third instruction 504 is true (element 544) and a result of INCLUSIVE-ORing 545 the events that the fourth instruction 505 is incorrect (element 546) and/or the first variable j is incorrect after the first instruction 502 (element 547);

ANDing 550 the events that the decision in accordance with the third instruction 504 is false (element 551) and a result of INCLUSIVE-ORing 552 the events that the fifth instruction is incorrect (element 553) and/or that the first variable j is incorrect after the first instruction 502 (element 554);

INCLUSIVE-ORing 560 the following events: the decision in accordance with the third instruction 504 is incorrect (element 561) and/or the second variable k is incorrect after the second instruction 503 (element 562).

Multiple Selection Element

A multiple selection element as reference element can be handled in accordance with the scheme described above by breaking down the multiple selection into a cascade of two-way selection elements processed in accordance with the procedure above, in order thus to ascertain a fault tree for a multiple selection element.

Loop

Figure 6C:
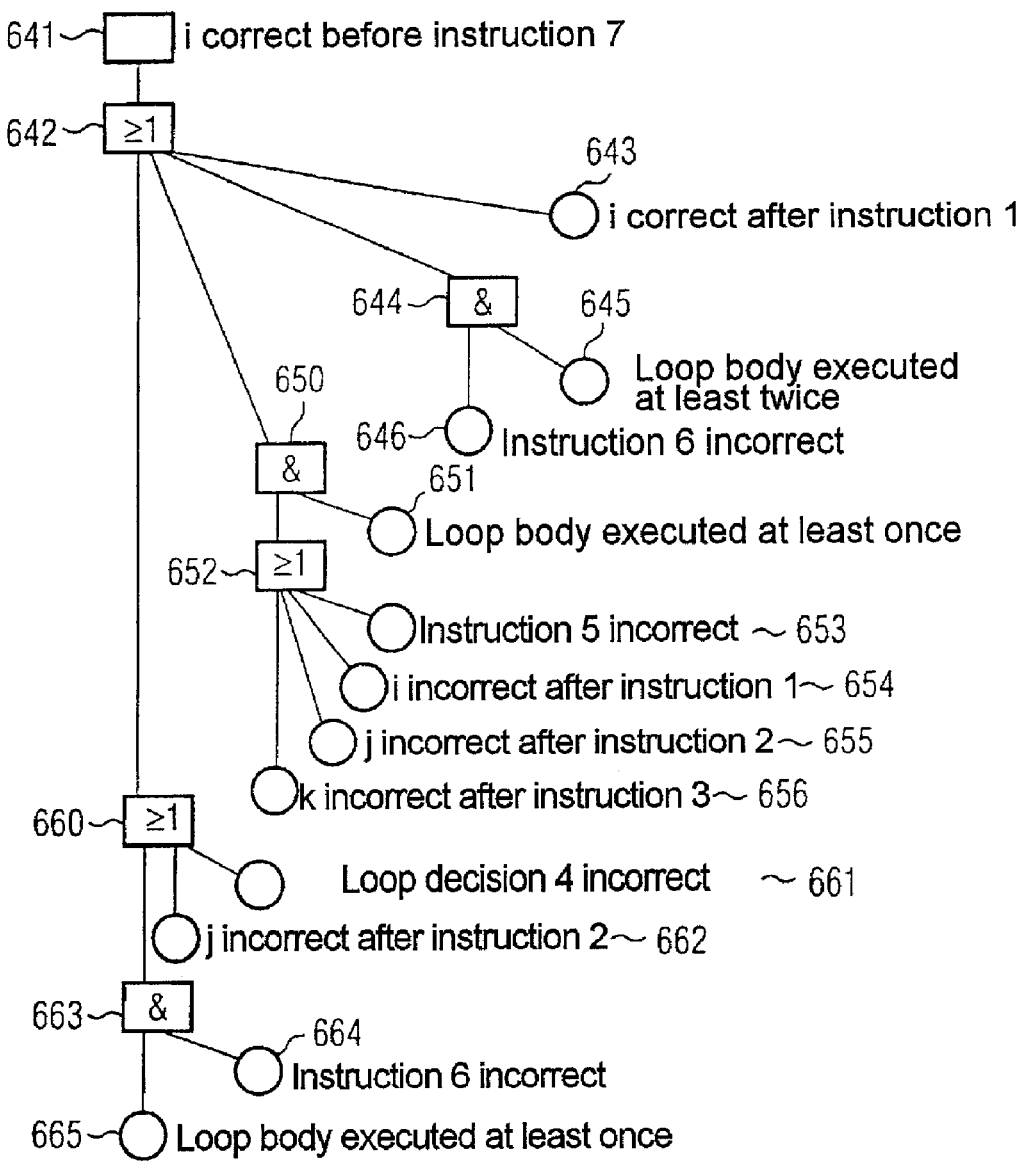

FIGS. 6a to 6c show a fault tree 601 (cf. FIG. 6a), the corresponding slice 620 (cf. FIG. 6b) and the associated fault tree 640 (cf. FIG. 6c) for the reference element of a loop. The control flow graph 601 for a loop element comprises the following seven instructions:

a first instruction 602, which assigns a first variable i the value 0 (i:=0), a second instruction 603, which assigns a second variable j an unspecified value (j:= . . . ), a third instruction 604, which prescribes a further unspecified value for a third variable k (k:= . . . ), a fourth instruction 605, which, as a loop instruction, specifies a condition that a fifth instruction and a sixth instruction are executed until the value of the second variable is j>0 (WHILE j>0 DO), a fifth instruction 606, which assigns the first variable i a value which is obtained from the sum of the previous value of the first variable and the product of the second variable and the third variable (i:=i+k*j), a sixth instruction 607, which assigns the second variable j a value which is obtained by decreasing the original value of the second variable j by the value 1 (j:=j−1), a seventh instruction 608, which processes the first variable i further in a prescribable manner ( . . . :=i . . . ).

FIG. 6b shows the corresponding slice 620 for the control flow graph 601 shown in FIG. 6a with associated control flow edges and data flow edges. The fault tree 640 shown in FIG. 6c is formed for the prescribed event 641 that the "first variable i is incorrect before the seventh instruction".

The fault tree 640 is obtained by INCLUSIVE-ORing 642 the following four events:

a first event 643, which describes a situation in which the first variable i is incorrect after the first instruction 602, ANDing 644 the events that the loop body has been passed through at least twice (element 645) and the event that the sixth instruction 607 is incorrect (646), ANDing 650 the event that the loop body has been executed at least once (element 651) and INCLUSIVE-ORing 652 of the following four events:

a) the fifth instruction 606 is incorrect (element 653), b) the first variable i is incorrect after the first instruction (element 654), c) the second variable j is incorrect after the second instruction (element 655), d) the third variable k is incorrect after the third instruction (element 656), INCLUSIVE-ORing 660 the following three events:

e) the decision in accordance with the fourth instruction 605 is incorrect (element 661), f) the second variable j is incorrect after the second instruction 603 (element 662), g) ANDing 663 the events that the sixth instruction is incorrect (element 664) and the event that the loop body has been passed through at least once (element 665).

The fault trees described above, which are associated with the individual reference elements, are stored in the memory 102 as fault trees 115.

Figure 8A:
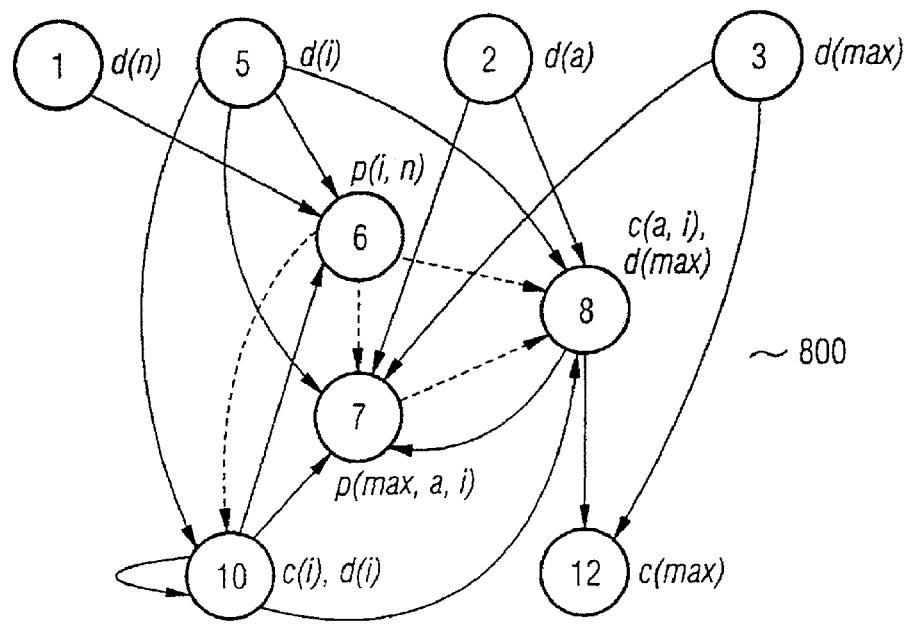
FIGS. 8a and 8b are flow diagrams for a slice for the output of the variable max (FIG. 8a) and a slice for the variable avr (FIG. 8b) for the program in accordance with the exemplary embodiment.
Figure 8B:
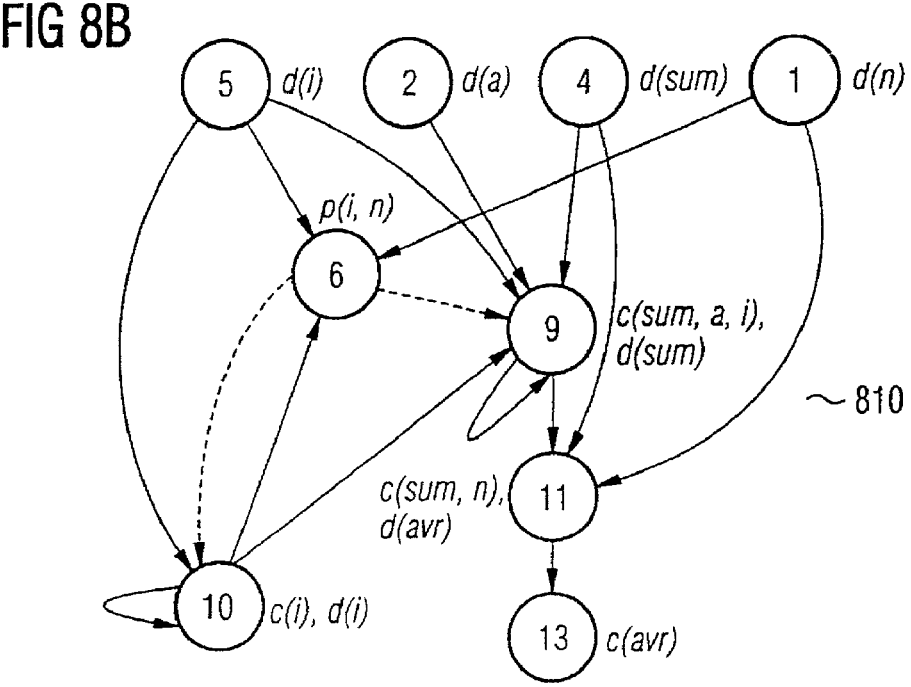

FIG. 7 shows a control flow graph 700 for the following computer program:

input (n);
input (a);
max:=0;
sum:=0;
i:=2;
WHILE i=n DO
IF max<a
THEN max:=a
sum:=sum+a
i:=i+1 avr:=sum/n;
output (max);
output (avr);

For the control flow graph 700 comprising 13 instructions (reference symbols 1, 2, 3, . . . , 13) which is shown in FIG. 7, FIG. 8a shows the associated slice 800 for the variable max and FIG. 8b shows the associated slice 810 for the variable avr. The numbering of the individual instructions in the slices corresponds to the numbering of the individual instructions in the control flow graph 700 from FIG. 7.

Figure 9:
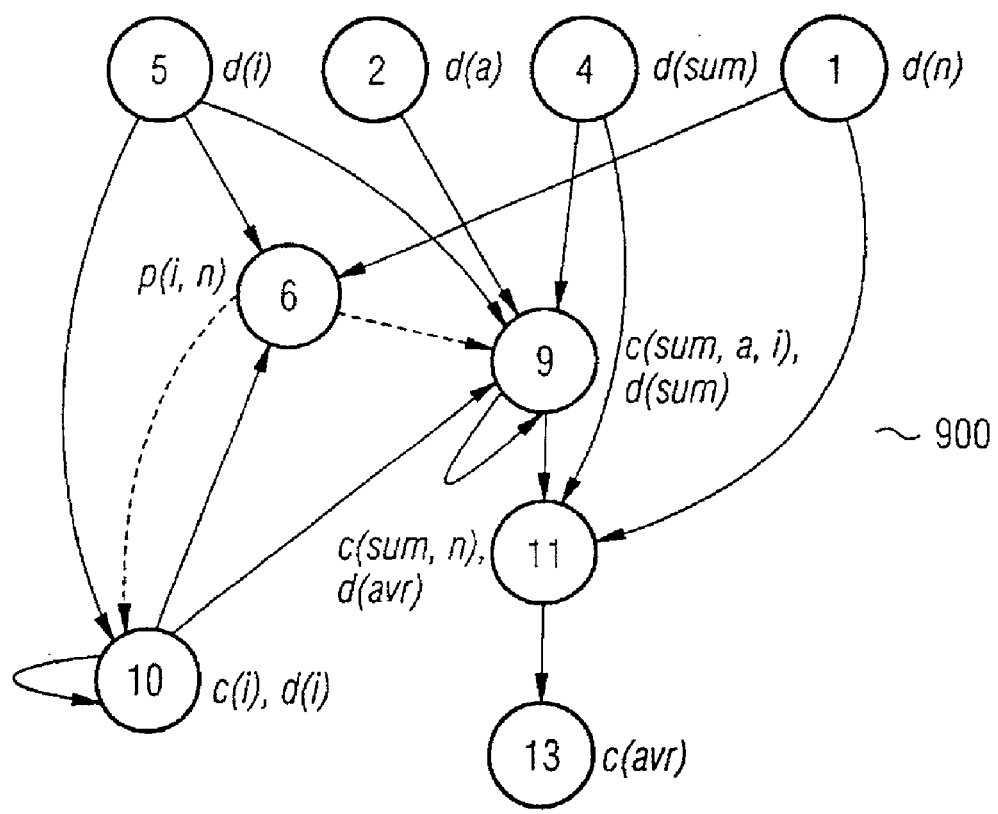
FIG. 9 is a flow diagram for the slice for the variable avr, in which a structure of the loop from the program in accordance with the exemplary embodiment is highlighted.

FIG. 9 shows the slice 900 for the variable avr, as shown in FIG. 8b. The structure of the loop element contained in the program shown above is highlighted in bold. This structure corresponds to the slice shown in FIG. 6b for a loop element.

An overall fault tree 1000 for the computer program shown above is shown in FIG. 10. The overall fault tree for the computer program is produced by instantiating the appropriate fault tree associated with the reference element which corresponds to the selected program element.

By starting from the prescribed undesirable event and working backward, the overall fault tree 1000 is thus ascertained using the fault trees associated with the reference elements.

Figure 10:
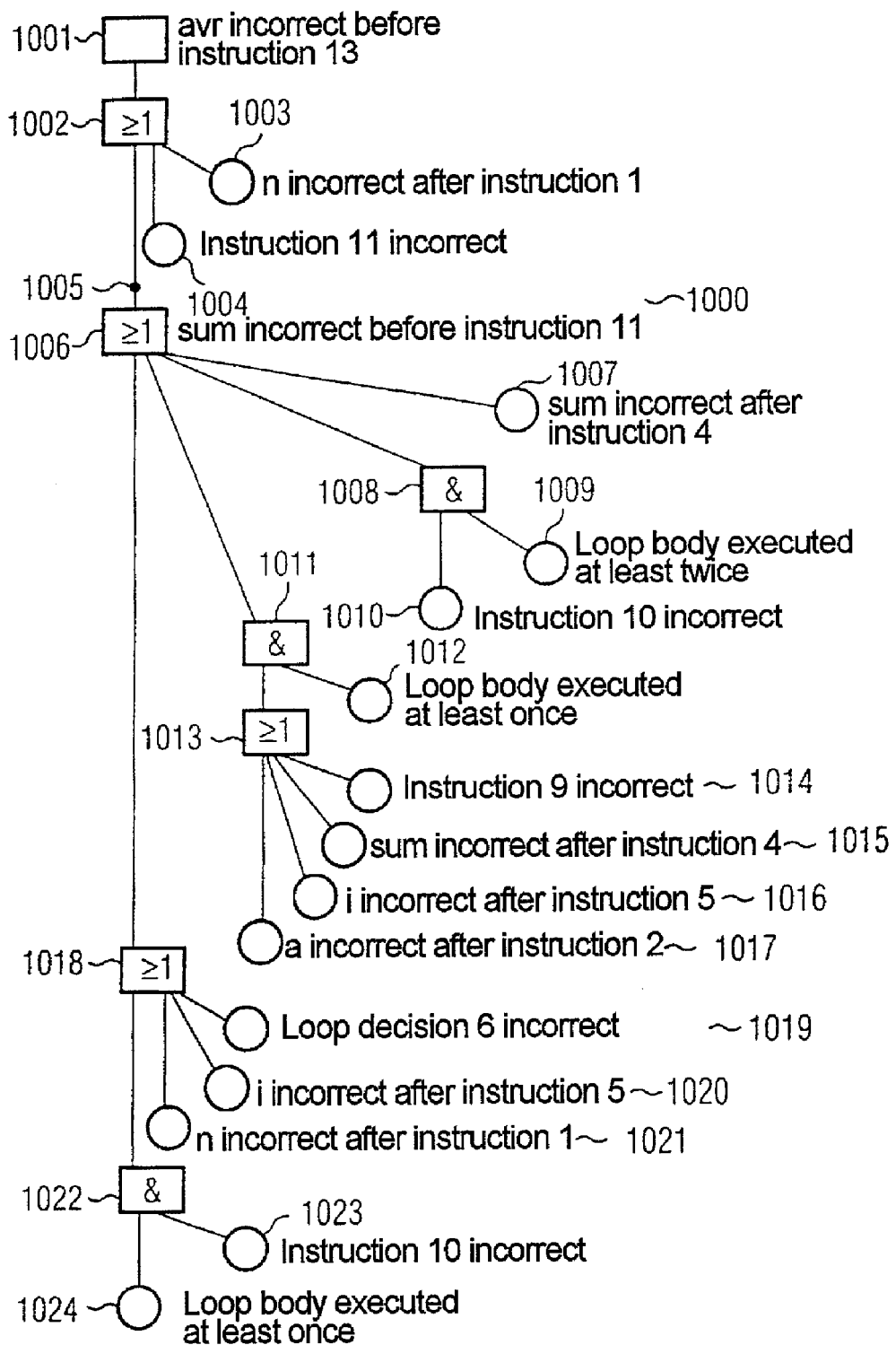
FIG. 10 is a flow diagram for a fault tree for the assumption that the variable avr is incorrect.

FIG. 10 contains the fault tree 1000 relating to the event that "the variable avr is incorrect before the thirteenth instruction" (element 1001). The variable avr may be incorrect before the thirteenth instruction 13 on account of at least one of the following three events, as is also shown in the slice 900 shown in FIG. 9 for the variable avr (INCLUSIVE-OR function 1002):
   an input variable n is incorrect after the first instruction 1 (element 1003),
   the eleventh instruction 11 is incorrect (element 1004),
   the value of the variable sum is incorrect before the eleventh instruction 11 (element 1005).

The variable sum is incorrect before the eleventh instruction 11 (element 1005) if at least one of the following events is satisfied (INCLUSIVE-OR function 1006):
   the variable sum is incorrect after the fourth instruction 4 (element 1007),
   ANDing 1008 the event that the loop body has been executed at least twice (element 1009) and the event that the tenth instruction 10 is incorrect (element 1010),
   ANDing 1011 the event that the loop body has been executed at least once (element 1012) and the result of INCLUSIVE-ORing 1013 the following four events:
   a) the ninth instruction 9 is incorrect (element 1014),
   b) the variable sum is incorrect after the fourth instruction 4 (element 1015),
   c) the variable i is incorrect after the fifth instruction 5 (element 1016),
   d) the variable a is incorrect after the second instruction 2 (element 1017),
   INCLUSIVE-ORing 1018 the following events:
   e) the decision in accordance with the sixth instruction is incorrect (element 1019),
   f) the variable i is incorrect after the fifth instruction (element 1020),
   g) the variable n is incorrect after the first instruction (element 1021),
   h) ANDing 1022 the event that the 10th instruction is incorrect (element 1023) and the event that the loop body has been executed at least once (element 1024).

To provide for clearer illustration, the fault tree 1000 from FIG. 10 is altered such that events shown a plurality of times in the fault tree 1000 are combined to form one node of a cause-effect graph 1100 (cf. FIG. 11).

The fault tree 1000 shown in FIG. 10 is subjected to a fault tree analysis method, as described in DIN 25424-2, which analyzes an analysis of the computer program for a prescribed undesirable event.

The text below illustrates alternatives and further opportunities for application of the exemplary embodiment described above.

The overall fault tree produced using the method described above can be used for various purposes:
   description of the fault generation or propagation of incorrect action by a section of a computer program within the context of safety analysis or reliability analysis for the computer program,
   analysis of software fault mechanisms, for example within the context of test case generation.

The invention has been described in detail with particular reference to preferred embodiments thereof and examples, but it will be understood that variations and modifications can be effected within the spirit and scope of the invention.

The invention claimed is:

1. A method for using a computer to ascertain an overall fault description for at least one section of a computer program, comprising:
   storing fault descriptions associated with reference elements to describe possible faults in the reference elements, respectively;
   storing a section of the computer program;
   ascertaining a control flow description for the section of the computer program, to describe a flow of control information in the section of the computer program;
   ascertaining a data flow description for the section of the computer program, to describe a flow of data in the section of the computer program;
   combining the control and data flow descriptions into a joint flow description for the section of the computer program;
   selecting program elements from the section of the computer program;
   matching each selected program element with a corresponding reference element to obtain a fault description associated with the corresponding reference element and thereby describe possible faults in the selected program element;
   ascertaining the overall fault description as an overall fault tree using the fault descriptions of the program elements from the computer program, with a structure of the overall fault description taking into account a structure of the joint flow description; and
   altering the overall fault tree in terms of prescribable boundary conditions.

2. The method as claimed in claims 1, wherein the control flow description is a control flow graph.

3. The method as claimed in claims 1, wherein the data flow description is a data flow graph.

4. The method as claimed in claim 1,
   wherein each of the fault descriptions associated with the reference elements is a fault tree, and
   wherein the overall fault description is ascertained as the overall fault tree based on fault trees associated with the corresponding reference element for each selected program element.

5. The method as claimed in claims 1, further comprising performing fault analysis in the section of the computer program using the overall fault description.

6. The method as claimed in claim 1, wherein said altering comprises adding a complementary fault tree.

7. A system for ascertaining an overall fault description for at least one section of a computer program, comprising:
- a storage unit to store the at least one section of the computer program and fault descriptions for reference elements, each fault description describing possible faults in one of the reference elements; and
- a processor, coupled to said storage unit,
  - to ascertain control and data flow descriptions for the at least one section of the computer program, the control flow description describing a flow of control information in the at least one section of the computer program and the data flow description describing a flow of data in the at least one section of the computer program,
  - to combine the control and data flow descriptions into a joint flow description for the at least one section of the computer program,
  - to select program elements from the at least one section of the computer program,
  - to match each selected program element with a corresponding reference element and obtain a fault description associated with the corresponding reference element and thereby describe possible faults in the selected program element; and
  - to ascertain the overall fault description as an overall fault tree using the fault descriptions of the program elements from the computer program, with a structure of the overall fault description taking into account a structure of the joint flow description; and
  - to alter the overall fault tree in terms of prescribable boundary conditions.

8. The method as claimed in claim 7, wherein said processor ascertains the control flow description as a control flow graph.

9. The system as claimed in claim 7, wherein said processor ascertains the data flow description as a data flow graph.

10. The system as claimed in claim 7,
- wherein said storage unit stores each fault description as a fault tree, and
- wherein said processor ascertains each element fault description as an element fault tree and the overall fault description as an overall fault tree.

11. The system as claimed in claim 7, wherein said processor further performs fault analysis in the at least one section of the computer program using the overall fault description.

12. The system as claimed in claim 7, wherein said processor alters the overall fault tree by adding a complementary fault tree.

13. A computer-readable storage medium storing at least one program to control a computer to perform a method for ascertaining an overall fault description for at least one section of a computer program, said method comprising:
- storing a section of the computer program;
- ascertaining a control flow description for the section of the computer program, to describe a flow of control information in the section of the computer program;
- ascertaining a data flow description for the section of the computer program, to describe a flow of data in the section of the computer program;
- combining the control and data flow descriptions into a joint flow description for the section of the computer program;
- selecting program elements from the section of the computer program;
- storing a fault description for each reference element to describe possible faults in the reference element;
- matching each selected program element with a corresponding reference element to obtain a fault description associated with the corresponding reference element and thereby describe possible faults in the selected program element;
- ascertaining the overall fault description as an overall fault tree using the fault descriptions of the program elements from the computer program, with a structure of the overall fault description taking into account a structure of the joint flow description; and
- altering the overall fault tree in terms of Prescribable boundary conditions.

14. A computer-readable storage medium as claimed in claim 13, wherein said computer alters the overall fault tree by adding a complementary fault tree.

* * * * *